US012412549B2

(12) United States Patent
Ikemoto

(10) Patent No.: US 12,412,549 B2
(45) Date of Patent: Sep. 9, 2025

(54) PEDAL DEVICE AND ELECTRONIC KEYBOARD INSTRUMENT

(71) Applicant: CASIO COMPUTER CO., LTD., Tokyo (JP)

(72) Inventor: Hiroshi Ikemoto, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 228 days.

(21) Appl. No.: 18/297,896

(22) Filed: Apr. 10, 2023

(65) Prior Publication Data

US 2023/0335083 A1 Oct. 19, 2023

(30) Foreign Application Priority Data

Apr. 14, 2022 (JP) ................................. 2022-066716

(51) Int. Cl.
*G10C 3/26* (2019.01)
*G10H 1/32* (2006.01)

(52) U.S. Cl.
CPC ................. *G10C 3/26* (2013.01); *G10H 1/32* (2013.01)

(58) Field of Classification Search
CPC ........................................................ G10C 3/26
See application file for complete search history.

(56) References Cited

U.S. PATENT DOCUMENTS 2,460,494 A * 2/1949 Eisenberg .............. H01C 10/14 338/153
2,534,939 A * 12/1950 Alkire ...................... G10H 1/34 338/153
2,986,953 A * 6/1961 De Armond ........... H01C 10/14 338/153
3,894,445 A * 7/1975 Rowe ........................ H03G 5/02 338/153
6,460,429 B1 * 10/2002 Staker .................. B60K 26/021 74/513
8,378,204 B2 * 2/2013 Arayama ................. G10C 3/26 84/229
2006/0156903 A1 * 7/2006 Baird ..................... G10H 3/186 84/453
2020/0111466 A1 * 4/2020 Goto .................... G10H 1/0008
2023/0335083 A1 * 10/2023 Ikemoto ................... G10C 3/26

FOREIGN PATENT DOCUMENTS

CN 209657792 U * 11/2019 ............... G10C 3/26
JP H07219542 A 8/1995
JP H08202363 A 8/1996

(Continued)

OTHER PUBLICATIONS

Notice of Reasons for Refusal dated Mar. 19, 2024 received in Japanese Patent Application No. JP 2022-066716.

(Continued)

*Primary Examiner* — Robert W Horn
(74) *Attorney, Agent, or Firm* — SCULLY SCOTT MURPHY & PRESSER, PC

(57) ABSTRACT

A pedal device includes a base plate, a pedal supported rotatably, a rotary volume comprising a rotational shaft configured to rotate in association with the pedal, and an engagement member configured to be brought into engagement with a non-rotational portion provided around the rotational shaft of the rotary volume and with the base plate.

19 Claims, 8 Drawing Sheets

(56) References Cited

FOREIGN PATENT DOCUMENTS

| | | | | | |
|---|---|---|---|---|---|
| JP | H09311682 | A | | 12/1997 | |
| JP | 2002087108 | A | | 3/2002 | |
| JP | 2004334008 | A | | 11/2004 | |
| JP | 2011180511 | A | | 9/2011 | |
| JP | 2012013894 | A | | 1/2012 | |
| JP | 2016202945 | A | | 12/2016 | |
| JP | 2020056978 | A | * | 4/2020 | ........... G10H 1/0008 |

OTHER PUBLICATIONS

Extended European Search Report dated Sep. 8, 2023 received in European Patent Application No. EP 23165476.5.

* cited by examiner

PEDAL DEVICE AND ELECTRONIC KEYBOARD INSTRUMENT

CROSS-REFERENCE TO RELATED APPLICATION

This patent application is based upon and claims the benefit of priority under 35 USC 119 of Japanese Patent Application No. 2022-066716 filed on Apr. 14, 2022, the entire disclosure of which, including the specification, claims, drawings and abstract, is incorporated herein by reference in its entirety.

BACKGROUND

Technical Field

The present disclosure relates to a pedal device and an electronic keyboard instrument.

Description of the Related Art

There have conventionally been disclosed pedal devices including a sensor such as a rotary volume for detecting a depressing amount of a pedal. Japanese Unexamined Patent Application Publication No. 2011-180511 (JP-A-2011-180511) discloses a sensor in which a lever portion of the sensor is pressed down via a motion transmitting portion of a pedal as a result of a depressing operation of the pedal to thereby detect a depressing amount of the pedal.

SUMMARY

According to an aspect of the present disclosure, there is provided a pedal device including a base plate, a pedal supported rotatably, a rotary volume including a rotational shaft configured to rotate in association with the pedal, and an engagement member configured to be brought into engagement with a non-rotational portion provided around the rotational shaft of the rotary volume and with the base plate.

According to another aspect of the present disclosure, there is provided an electronic keyboard instrument including the pedal device described above.

DESCRIPTION OF THE EMBODIMENT

Figure 1:
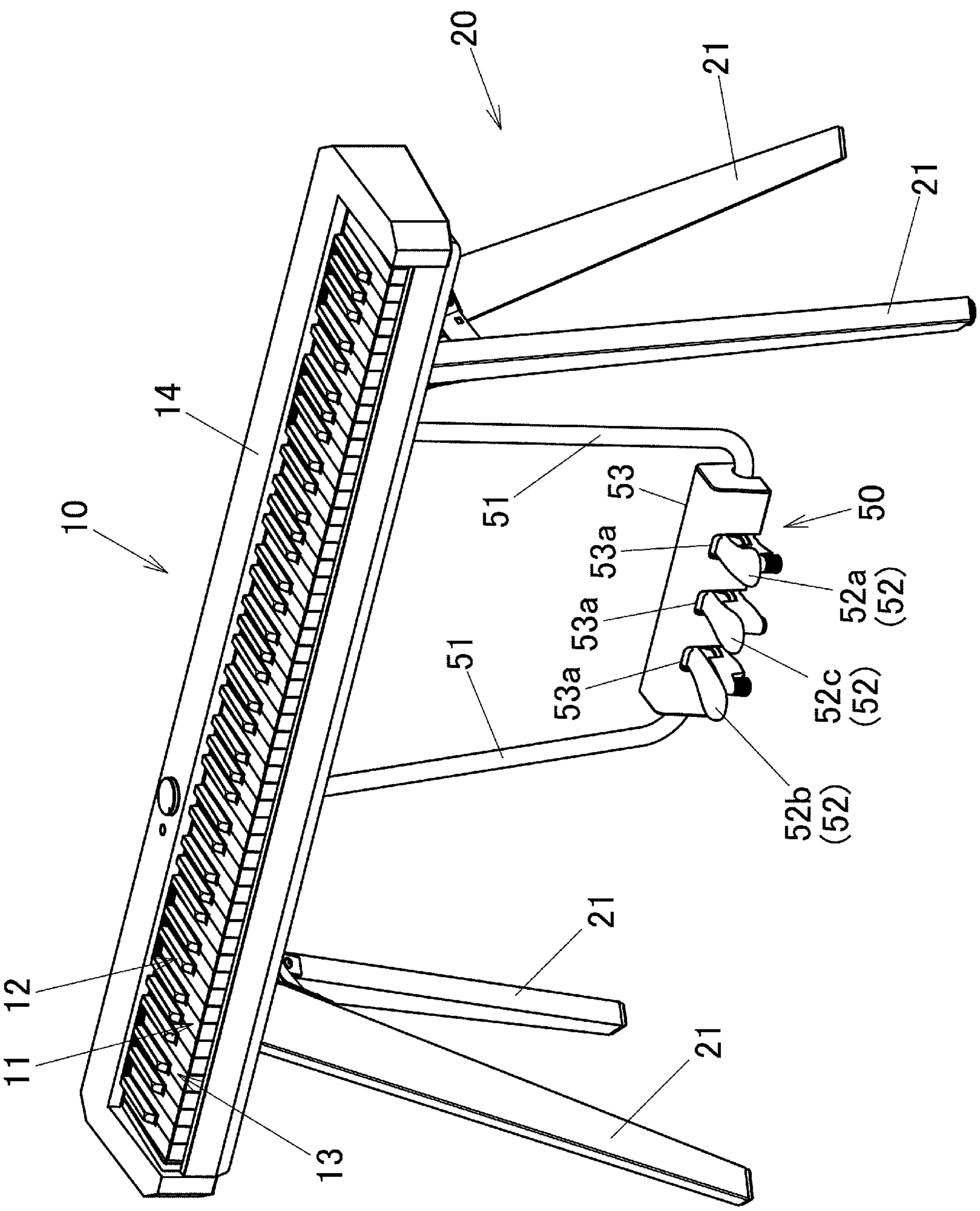
FIG. 1 is a perspective view of an electronic keyboard instrument including a pedal device according to an embodiment of the present disclosure.

Hereinafter, an embodiment of the present disclosure will be described based on drawings. An electronic keyboard instrument 10 shown in FIG. 1 includes an instrument case 14 including a base plate, a speaker, and the like which are provided in an interior thereof. The instrument case 14 includes further a full-scale (88-note) keyboard 13 including plural white keys 11 and plural black keys 12. A leg portion 20 having four legs 21 is connected to a lower surface of the instrument case 14 (the electronic keyboard instrument 10). The electronic keyboard instrument 10 is supported by the leg portion 20. In the following description, a nearer side of the keyboard 13 is referred to as a front side, and an opposite side to the nearer side is referred to as a rear side. When facing the keyboard 13, a left side is referred to as left or a left side, and a right side is referred to as right or a right side. A side of the keyboard 13 facing upwards is referred to as upper or an upper side, and a side of the keyboard 13 facing the leg portion 20 is referred to as lower or a lower side.

Connecting rods 51, that is, a left connecting rod 51 and a right connecting rod 51 are provided between the two legs 21 on the left side and the two legs 21 on the right side of the electronic keyboard instrument 10. Although not shown, each connecting rod 51 is connected to a rear surface of the electronic keyboard instrument 10 at an upper end portion while extending downwards therefrom. The left and right connecting rods 51 are connected individually to a left side and a right side of a pedal device 50, respectively. The pedal device 50 provided on the electronic keyboard instrument 10 includes pedals 52, so that the electronic keyboard instrument 10 can be operated in various ways by depressing the pedals 52. For example, a damper effect can be imparted to the electronic keyboard instrument 10. The pedal device 50 includes a pedal case 53 which covers a base plate 161, sensor units 160, bearing portions 153, and the like (which will be described later).

The pedal case 53 is formed substantially into a rectangular parallelepiped box elongated in a left-right direction and including front and rear surfaces, a left and right surfaces, and an upper surface. Thus, the pedal case 53 is opened in a lower surface side. The pedal case 53 includes three opening portions **53*a* formed therein. The pedal device 50 includes three pedals 52 which are aligned in a row to be positioned on a left side, a right side, and at a center (a right pedal 52*a*, a left pedal 52*b*, a center pedal 52*c*). Each pedal 52 projects forwards (outwards) via the corresponding opening portion 52*a* in the pedal case 53** while being configured to rotate.

Figure 2:
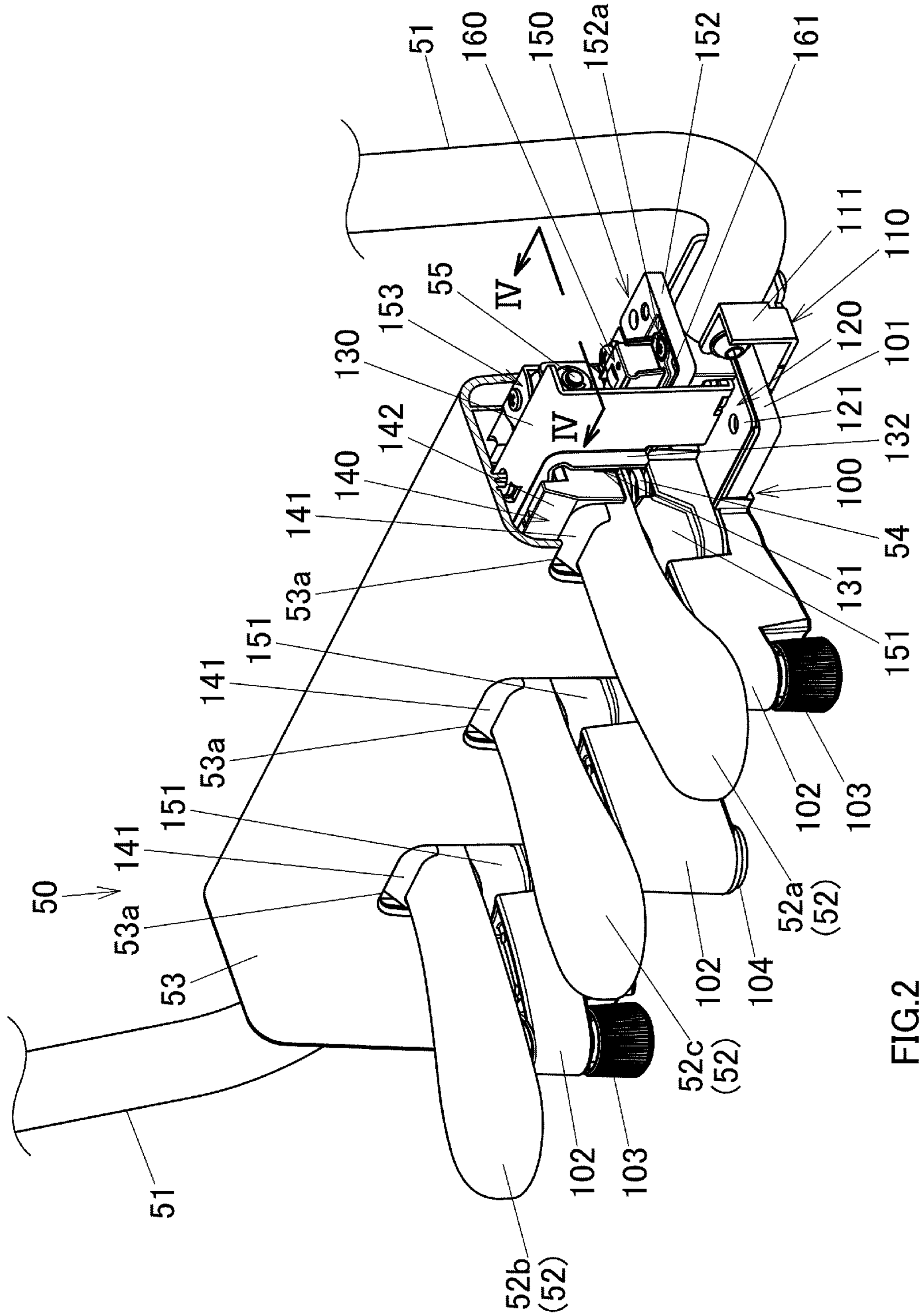
FIG. 2 is a partially sectional perspective of the pedal device according to the embodiment of the present disclosure in which, a pedal case is shown as partially being cross-sectioned.
Figure 3:
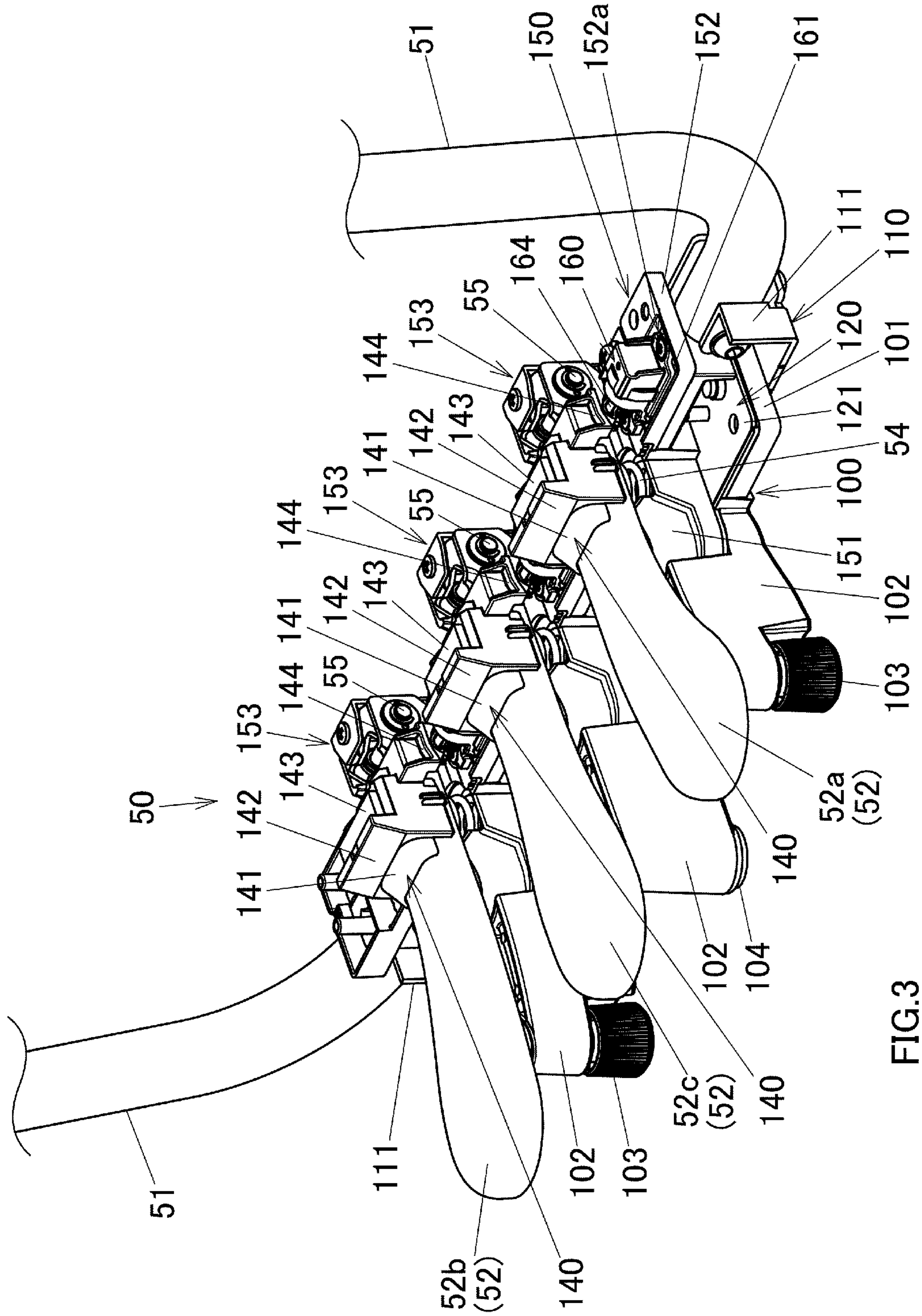
FIG. 3 is a perspective view of the pedal device according to the embodiment of the present disclosure with the pedal case and a front sheet metal member omitted from illustration.

As shown in FIGS. 2 and 3, a lower base member 100 is provided in the pedal device 50. The lower base member 100 includes a lower base member main body portion 101 elongated in the left-right direction and having a flat plate shape and three pedal facing portions 102 extending forwards from the lower base member main body portion 101 in such a manner as to face the corresponding pedals 52.

Figure 4:
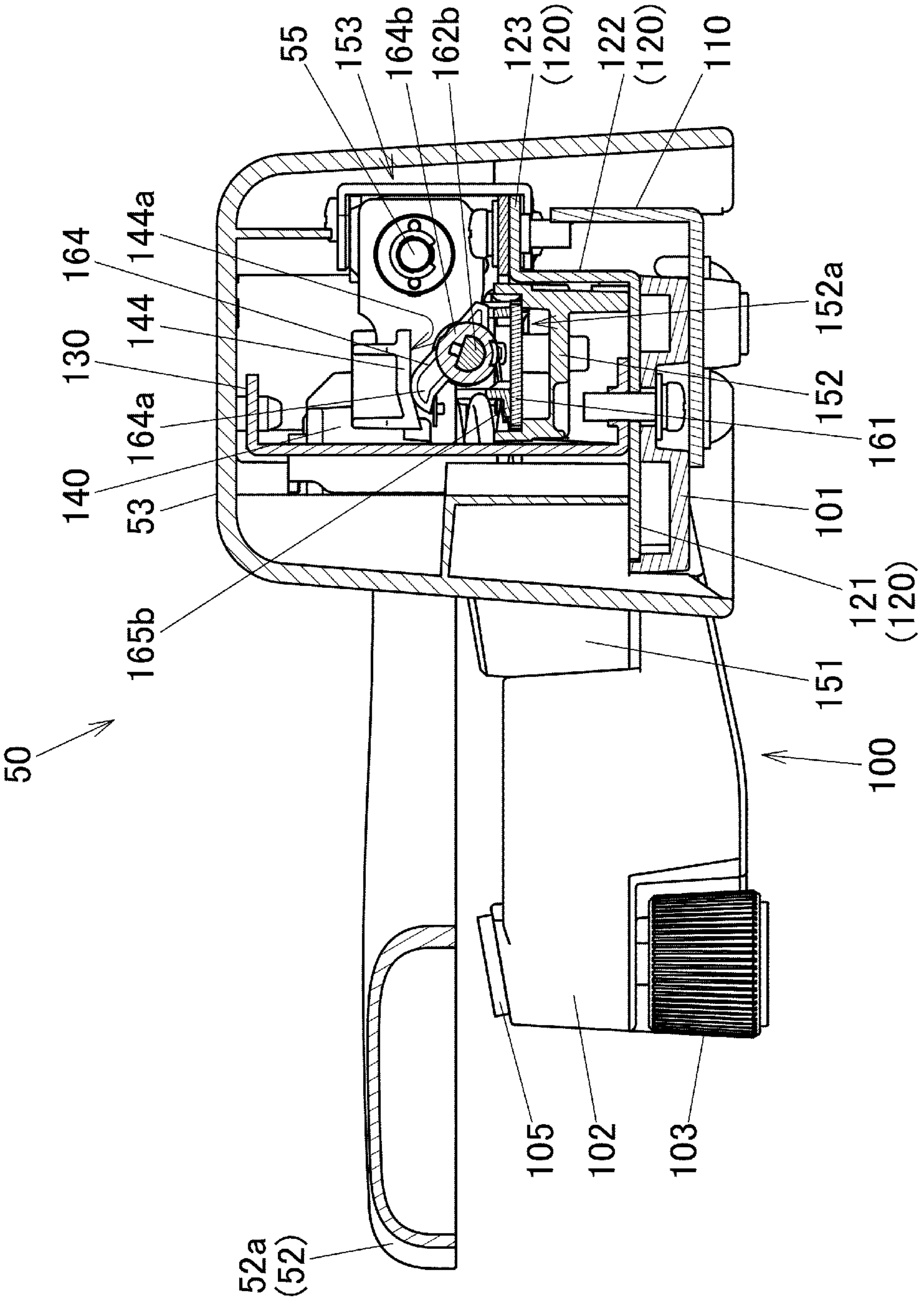
FIG. 4 is a cross-sectional view of the pedal device according to the embodiment of the present disclosure taken along a line IV-IV in FIG. 2 and viewed in a direction indicated by arrows attached to the line.

Adjustment members 103 are provided individually on a left and right pedal facing portions 102 in such a manner as to be screwed to the corresponding pedal facing portions 102 for connection thereto. The adjustment members 103 are configured to be adjusted for abutment with a setting surface. A pad 104 is provided on a central pedal facing portion 102 in such a manner as to face the setting surface. As shown in FIG. 4, cushion members 105 are provided individually on upper surfaces of the pedal facing portions 102 which are situated opposite to the adjustment members 103 and the pad 104. The cushion members 105 are configured to be brought into abutment with lower surfaces of the corresponding pedals 52 to thereby restrict lower limit positions of the relevant pedals 52. For example, a felt material can be used for the cushion members 105.

As shown in FIGS. 2 and 3, a lower sheet metal member 110 having an L-shaped cross section (refer to FIG. 4) is provided on a lower surface of the lower base member main body portion 101 of the lower base member 100. The lower sheet metal member 110 includes fixing portions 111 which are provided individually at left and right end portions thereof in such a manner as to rise upright therefrom. The left and right fixing portions 111 are fixed individually to lower end portions of the left and right connecting rods 51, respectively, with a screw member.

An upper sheet metal member 120 is provided on an upper surface of the lower base member main body portion 101 of the lower base member 100. As shown in FIG. 4, the upper sheet metal member 120 includes a lower plate portion 121, which is disposed on the lower base member main body portion 101 into a flat plate, an upper plate portion 123 of a flat plate shape, and a connecting plate 122, which is provided upright in a vertical direction so as to connect the lower plate portion 121 and the upper plate portion 123 together.

As shown in FIG. 2, the pedal device 50 includes a front sheet metal member 130 provided in such a manner as to rise upright from an upper surface of the lower plate portion 121 with upper and lower longitudinal end portions bent rearwards. As shown in FIG. 4, the front sheet metal member 130 is fixed to the lower plate portion 121 and the lower base member main body portion 101 as a result of a lower plate portion, that is, the lower longitudinal end portion bent rearwards being fastened together therewith with a screw member. An upper plate portion of the front sheet metal member 130, that is, the upper longitudinal end portion bent rearwards is fixed to a lower surface of an upper plate portion of the pedal case 53. Returning to FIG. 2, the front sheet metal member 130 includes opening portions 131 formed therein in such a manner as to correspond individually to the pedals 52. The opening portions 131 are each configured to be opened in a lower side thereof. A rib 132 is provided around a circumferential edge portion of each opening portion 131. In FIG. 2, only the opening portion 131 (the rib 132) is shown which corresponds to the right pedal 52*a*.

As shown in FIGS. 2 and 3, a restricting member 140 is provided at a proximal end portion on an upper surface side of each pedal 52. The restricting member 140 has a first restricting portion 141 and a second restricting portion 142. The first restricting portion 141 includes an inclined surface which is inclined towards the proximal end portion of the pedal 52 in such a manner as to cover an upper surface of the pedal 52. The second restricting portion 142 includes an inclined surface which is disposed on the first restricting portion 141 in such a manner as to connect thereto and is inclined towards the proximal end portion of the pedal 52. The restricting member 140 reduces a risk of the finger or the like entering the pedal device 50 via the opening portion 53*a*.

As shown in FIG. 3, a rectangular plate-shaped cushion member 143 is provided on an upper surface of the restricting member 140 behind the second restricting portion 142. For example, a felt material can be used for the cushion member 143. The cushion member 143 is brought into abutment with an upper portion of the opening portion 131 (the rib 132) in the front sheet metal member 130 so as to restrict an upper limit position of the pedal 52 which is biased upwards by a coil spring 54, which will be described later. Additionally, the restricting member 1140 includes an arm portion 144 provided in such a manner as to project towards the sensor unit 160, which will be described later, for engagement with a cam member 164 of the sensor unit 160 (also, refer to FIG. 4). A cam surface 144*a*, which is made up of a bent planar surface portion, is provided on a lower surface of the arm portion 144 (refer to FIG. 4).

An upper base member 150 is provided above the lower base member 100 via the upper sheet metal member 120. The upper base member 150 includes spring holding portions 151 provided in such a manner as to correspond individually to portions defined above respective proximal end portions of the pedal facing portions 102 of the lower base member 100. The spring holding portion 151 has a cylindrical shape and includes the coil spring 54 disposed in an interior thereof. The coil spring 54 is supported on a base of the spring holding portion 151 at a lower end thereof. An upper end of the coil spring 54 is connected with a spring receiving member (not shown) provided on a lower surface of the pedal 52. The pedal 52 is biased upwards by the coil spring 54.

A proximal end portion of each spring holding portion 151 on the upper base member 150 connects with an upper base member main body portion 152. The upper base member main body portion 152 is provided into a plate which is elongated in the left-right direction. Bearing portions 153 are provided on an upper surface of the upper base member main body portion 152 in such a manner as to correspond individually to the pedals 52. The bearing portions 153 are configured to support rotatably rotational shafts 55 provided individually at the proximal end portions of the pedals 52. The upper surface of the upper base member main body portion 152 is made into a recessed portion 152*a* which is elongated in the left-right direction. The base plate 161 is provided in the recessed portion 152*a*. The sensor units 160 are provided on an upper surface of the base plate 161. Although this will be described later, the sensor unit 160 is such that a cam portion 164*a* of the cam member 164 is brought into abutment with the cam surface 144*a* of the arm portion 144 of the restricting member 140 for engagement, and a rotational shaft 162*b* of a rotary volume 162 is interlocked with the pedal 52.

Figure 5:
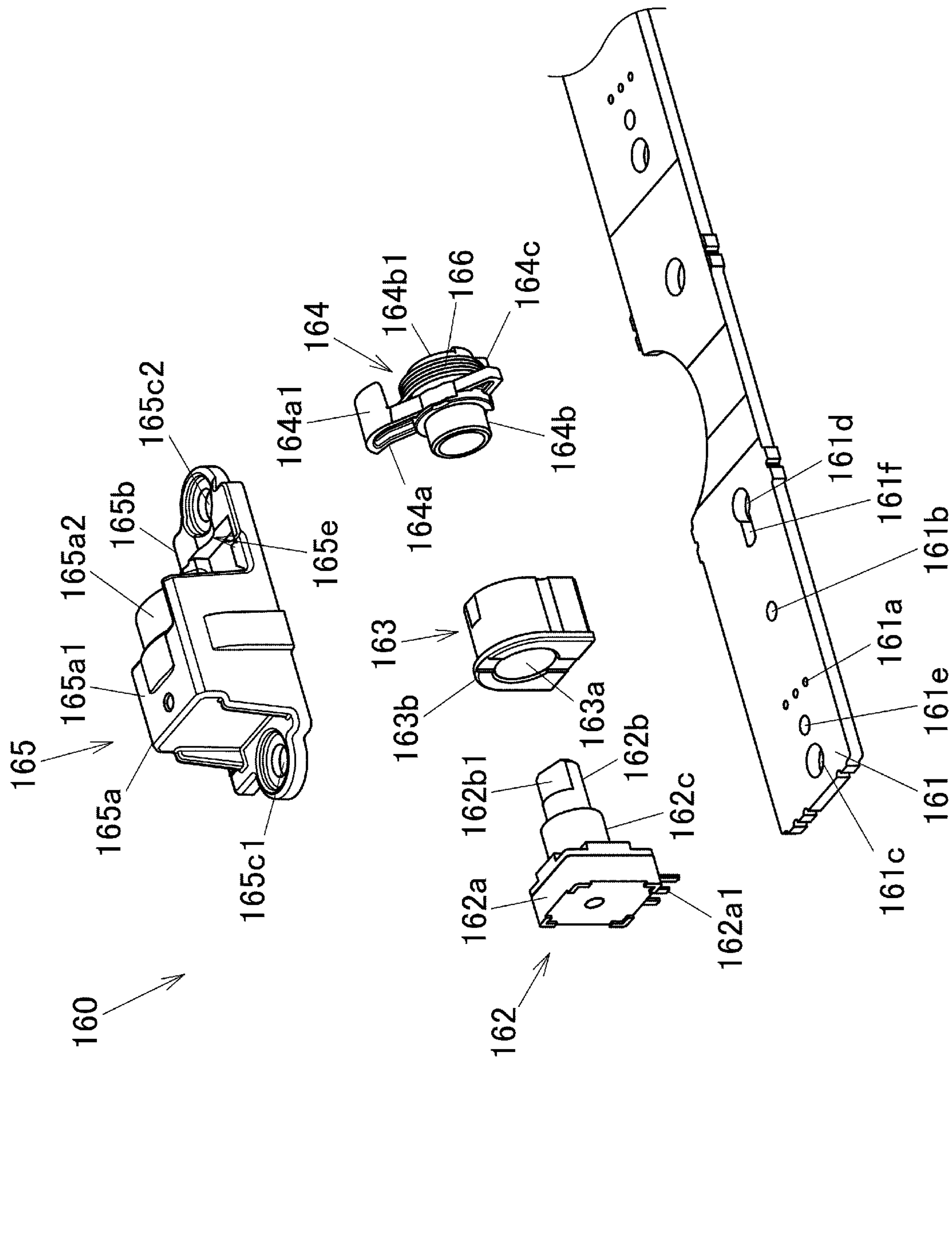
FIG. 5 is an exploded perspective view of a sensor unit and a base plate of the pedal device according to the embodiment of the present disclosure as viewed from a right side.
Figure 6:
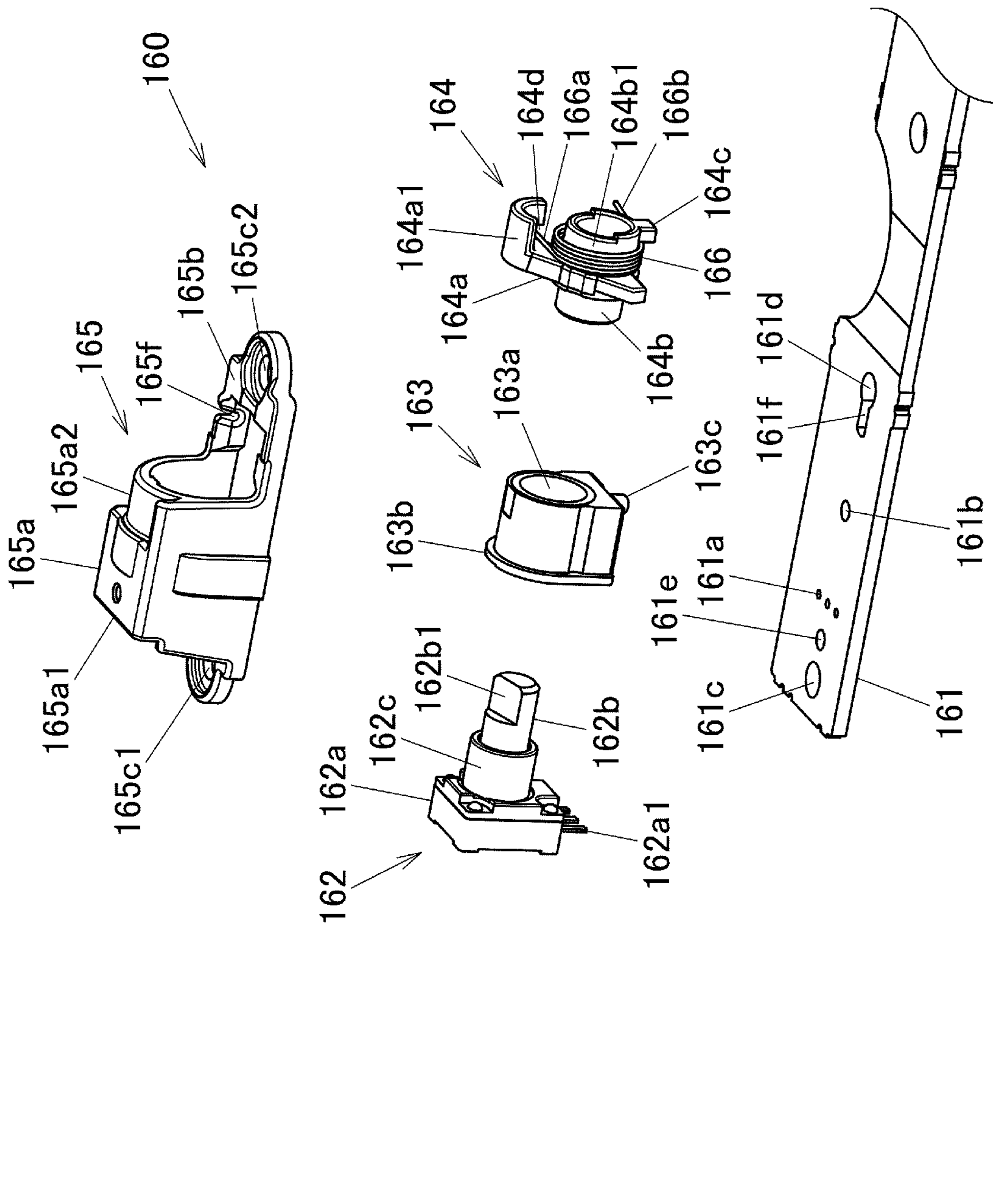
FIG. 6 is an exploded perspective view of the sensor unit and the base plate of the pedal device according to the embodiment of the present disclosure as viewed from a left side.

As shown in FIGS. 5 and 6, the sensor unit 160 includes the rotary volume 162, an engagement member 163, the cam member 164, a cover member 165, and a torsion coil spring 166. A rotary volume using a variable resistor or a rotary volume including a rotary encoder for outputting a rotational angle of the rotational shaft 162*b* can be used for the rotary volume 162. The rotary volume 162 includes three terminals 162*a*1 provided in such a manner as to project from a lower surface of a main body portion 162*a* of a substantially rectangular parallelepiped box shape. The terminals 162*a*1 are inserted into terminal hole portions 161*a*1 formed in the base plate 161 and are then soldered. The rotary volume 162 includes the rotational shaft 162*b*. The pedal device 50 includes a processor (not shown) on the base plate 161 or the like. This processor is configured to derive a depressing amount of the pedal 52 in accordance with a rotating amount of the rotational shaft 162*b*. A surface cut-out portion 162*b*1 is provided on the rotational shaft 162*b*. A portion of the rotational shaft 162*b* where the surface cut-out portion 162*b*1 is provided has a D-shaped cross section. A substantially cylindrical non-rotational portion 162*c* is provided around a proximal end portion of the rotational shaft 162*b* of the rotary volume 162. The non-rotational portion 162*c* constitutes a portion which is fixed to the main body portion 162*a* and never rotates together with the rotational shaft 162*b*.

The engagement member 163 is formed substantially into a rectangular block made up of a semi-circular upper part and a substantially flat lower surface and includes a support hole portion 163*a* provided in such a manner as to penetrate the engagement member 163 in an axial direction of the rotational shaft 162*b* of the rotary volume 162. A collar portion 163*b* (an abutment portion) is provided on an end side of the engagement member 163 which faces the rotary volume 162. A boss 163*c* is provided on a lower surface of the engagement member 163 in such a manner as to project downwards therefrom. The non-rotational portion 162*c* of the rotary volume 162 is inserted into the support hole portion 163*a* of the engagement member 163 in such a manner that an outer circumferential surface of the non-rotational portion 162*c* is brought into sliding contact with an inner circumferential surface of the support hole portion 163*a*. The boss 163*c* of the engagement member 163 is lightly press fitted in a hole portion 161*b* in the base plate 161. Then, an abutment surface 163*d*, which is the flat lower surface, is brought into abutment with the upper surface of the base plate 161. In this way, the engagement member 163 is in engagement with the non-rotational portion 162*c* of the rotary volume 162 and the base plate 161.

The cam member 164 includes a substantially cylindrical attachment portion 164*b* and the cam portion 164*a* provided in such a manner as to project radially outwards from the attachment portion 164*b*. The cam portion 164*a* is provided substantially in an axially central position of the attachment portion 164*b*. A cam surface 164*a*1 of a convex arc-like shape is provided at a distal end portion of the cam portion 164*a* in such a manner as to project to the left side. An outer circumference of the attachment portion 164*b* on a side where the cam surface 164*a*1 projects is made into a spring disposing portion 164*b*1, and the torsion coil spring 166 is disposed therearound. A projection 164*c* is provided at lower portion at a left end of the attachment portion 164*b* in such a manner as to project radially outwards.

Figure 7:
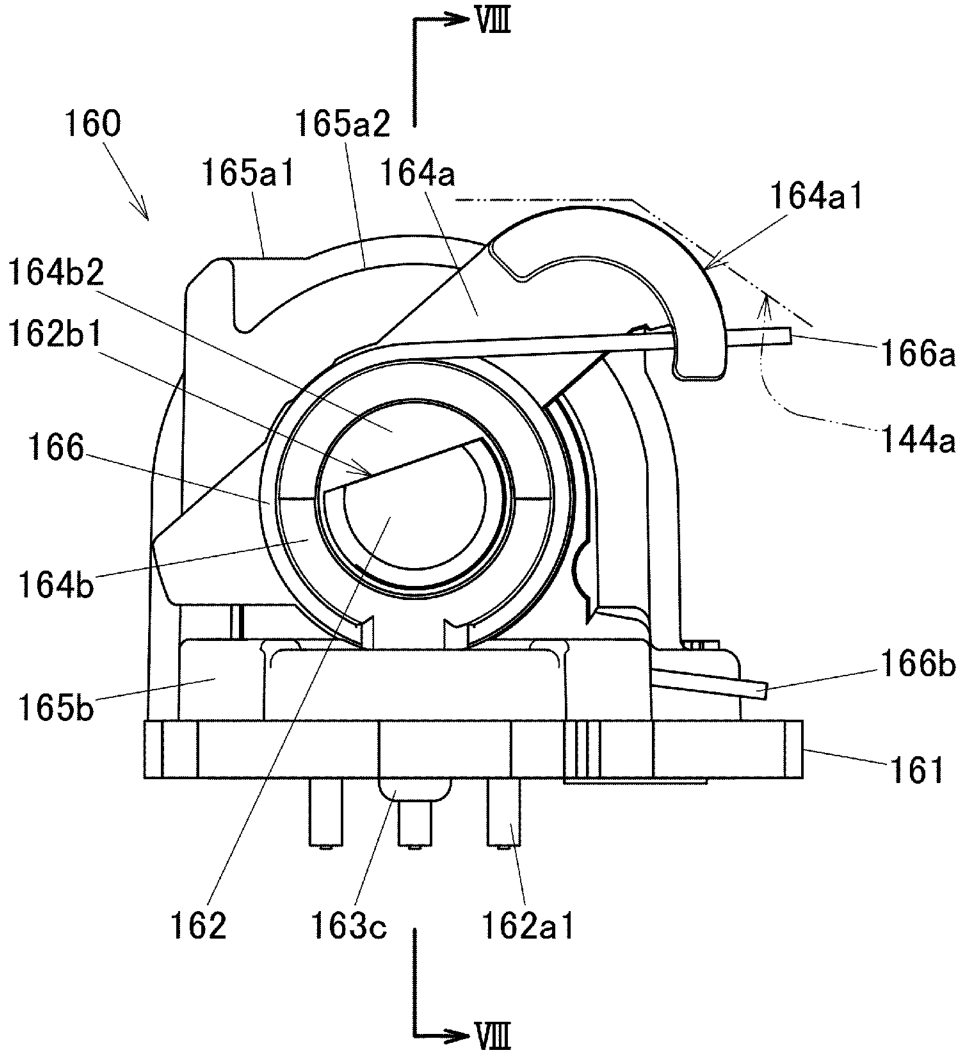
FIG. 7 is a side view of the sensor unit of the pedal device according to the embodiment of the present disclosure as viewed from the right side.
Figure 8:
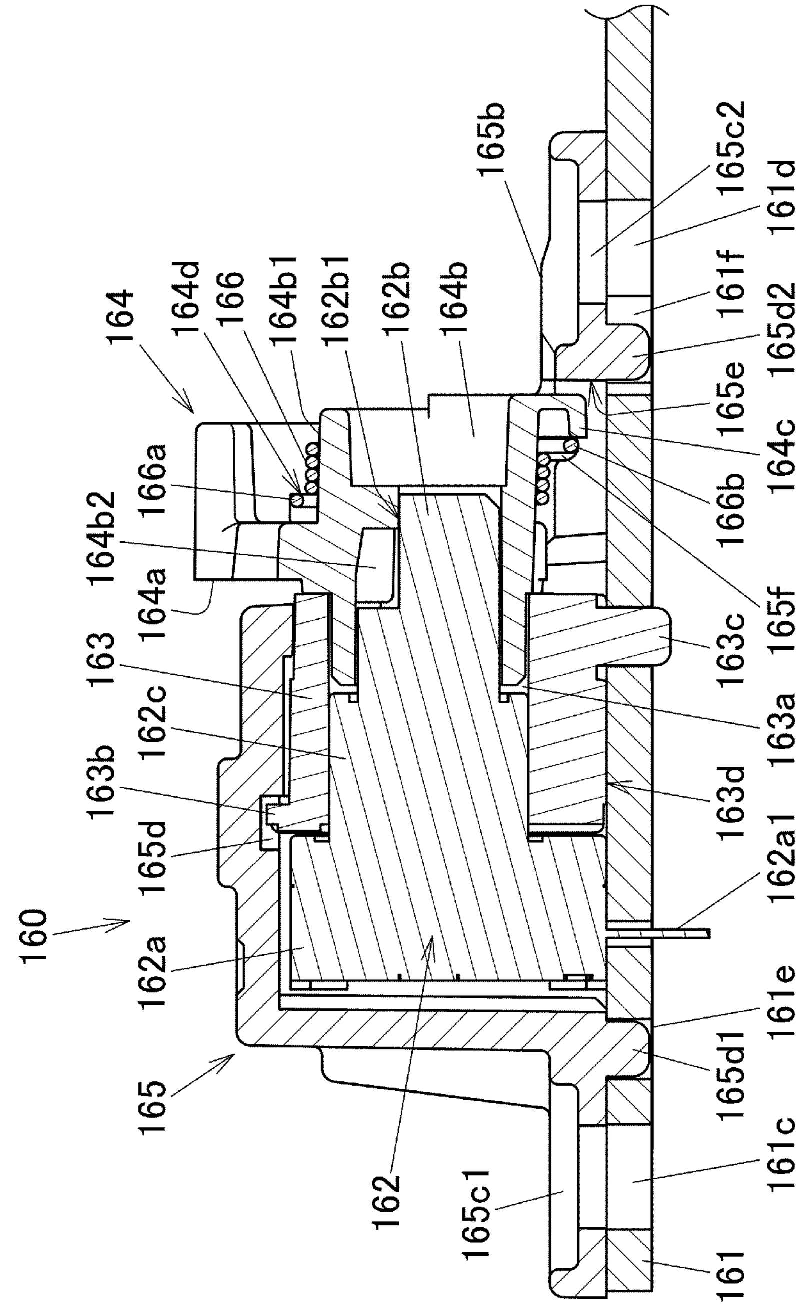
FIG. 8 is a sectional view of the pedal device according to the embodiment of the present disclosure taken along a line VIII-VIII in FIG. 7.

The cam member 164 is attached to the rotational shaft 162*b* of the rotary volume 162. As shown in FIGS. 7 and 8, the attachment portion 164*b* of the cam member 164 includes a positional aligning portion 164*b*2 provided in such a manner as to project from an inner circumferential surface of the attachment portion 164*b*, whereby a substantially axially central portion of a substantially cylindrical interior is made into a cross-sectionally D-shaped hole. As a result, the cam member 164 is attached to the rotational shaft 162*b* in such a manner that the positional aligning portion 164*b*2 is brought into abutment with the surface cut-out portion 162*b*1 of the rotational shaft 162*b*. In this way, the cam member 164 is fixed to the rotational shaft 162*b* while being restricted from rotating relatively to the rotational shaft 162*b*.

As shown in FIGS. 5 and 6, the cover member 165 includes a cover main body portion 165*a*, which is opened downwards, and a frame portion 165*b* of a frame shape, which is provided to extend leftwards from a lower end portion of the cover main body portion 165*a*. The cover main body portion 165*a* includes a rectangular parallelepiped box portion 165*a*1 and an arc-shaped portion 165*a*2 which are contiguous with each other. A bolt hole 165*c*1 and a bolt hole 165*c*2 are provided laterally outwards of the cover main body portion 165*a* and the frame portion 165*b*, respectively.

The cover member 165 is fixedly screwed to the base plate 161 via the bolt holes 165*c*1, 165*c*2 at bolt holes 161*c*, 161*d* in the base plate 161, respectively. Here, as shown in FIG. 8, bosses 165*ds*, 165*d*2 are provided on a lower surface of the cover member 165 in positions lying near inner sides of the bolt holes 165*c*1, 165*c*2, respectively. Then, the boss 165*d*1 is lightly press fitted in a hole portion 161*e*, and the boss 165*d*2 is inserted in a slightly elongated hole portion 161*f* which communicates with the bolt hole 161*d* while the boss 165*d*2 is being lightly press fitted therein in a radial direction thereof.

The cover member 165 covers most (the main body portion 162*a*, the non-rotational portion 162*c*, and a part of a proximal portion side of the rotational shaft 162*b*) of the rotary volume 162. In other words, the cover main body portion 165*a* covers generally the main body portion 162*a* of the rotary volume 162 with the rectangular parallelepiped box portion 165*a*1 and covers the engagement member 163 with the arc-shaped portion 165*a*2.

Here, a first movement restricting portion 165*d* of a groove shape is provided on an inner surface of an upper portion of the rectangular parallelepiped box portion 165*a*1 substantially on a boundary portion between the rectangular parallelepiped box portion 165*a*1 and the arc-shaped portion 165*a*2. An upper portion of the collar portion 163*b* of the engagement member 163 is disposed in the first movement restricting portion 165*d*. A left side wall surface (a right side wall surface in FIG. 8) of the first movement restricting portion 165*d* faces the collar portion 163*b*. The engagement member 163 is restricted from moving towards an axially distal end of the rotational shaft 162*b* by an abutment of the relevant side wall surface of the first movement restricting portion 165*d* with the collar portion 163*b*.

The frame portion 165*b* is disposed in such a manner that the cam member 164 is accommodated within the frame portion 165*b*. The projection 164*c* of the cam member 164 faces a second movement restricting portion 165*e* which constitutes a left inner wall surface of the frame portion 165*b* of the cover member 165. The cam member 164 is restricted from moving towards the axially distal end of the rotational shaft 162*b* by an abutment of the second moving restricting portion 165*e* with an end face of the projection 164*c*.

One (an upper) leg portion 166*a* of the torsion coil spring 166 provided around the spring disposing portion 164*b*1 of the cam member 164 is locked on a spring locking portion 164*d*, which is provided by a cut formed on a portion where the cam surface 164*a*1 is formed. The other (a lower) leg portion 166*b* of the torsion coil spring 166 is locked on a spring locking portion 165*f*, which is provided by a cut provided on a front side of the frame portion 165*b* of the cover member 165. As shown in FIG. 7, the cam member 164 is biased counterclockwise (in other words, upwardly) together with the rotational shaft 162*b* of the rotary volume 162 by the torsion coil spring 166 as viewed from a distal end side of the rotational shaft 162*b*. As a result, the cam portion 164*a* (the cam surface 164*a*1) of the cam member 164 is brought into abutment with the cam surface 144*a* constituting a lower surface of the arm portion 144 of the restricting member 140 which is fixed to the upper surface of the pedal 52 for engagement therewith at all times. As a result, the cam member 164 rotates together with the rotational shaft 162*b* of the rotary volume 162 in accordance with a depression of the pedal 52, whereby a depressing amount of the pedal 52 is detected by the rotary volume 162.

In attaching the sensor unit 160 to the base plate 161, firstly, the engagement member 163 is attached to the rotary volume 162 from the distal end side of the rotational shaft 162*b* in such a manner that the support hole portion 163*a* is brought into engagement with the non-rotational portion 162*c*. Subsequently, the cam member 164 is attached to the rotational shaft 162*b* of the rotary volume 162. Thereafter, the cover member 165 is attached to an assembly of the rotary volume 162, the engagement member 163, and the cam member 164. Then, the torsion coil spring 166 is attached in place, whereby the sensor unit 160 is assembled. Thereafter, the sensor unit 160 so assembled is attached to the base plate 161.

In the pedal device 50, the sensor unit 160 is provided for each pedal 52. For example, while the sensor unit 160 may be provided only for the right pedal 52*a* to impart a damper effect as on a real piano, by providing the sensor units 160 for the left pedal 52*b* and the center pedal 52*c*, as well, an unavailable function on a real piano (a function of exhibiting an effect in accordance with a depressing amount of the pedal 52) can also be realized in addition to the function of simply detecting whether or not (ON/OFF) the pedal 52 is depressed.

Thus, according to the embodiment of the present disclosure, the pedal device 50 includes the pedals 52 which are supported rotatably, the rotary volumes 162 provided on the base plate 161 and each including the rotational shaft 162*b* configured to rotate in association with the pedal 52, and the engagement members 163 each configured to be brought into engagement with the non-rotational portion 162*c* around the rotational shaft 162*b* of the rotary volume 162 and with the base plate 161.

As a result, since the rotary volume 162 is supported by the engagement member 163 which is fixed to the base plate 161, the rotational shaft 162*b* of the rotary volume 162 can be positioned in an ensured fashion. In particular, the inclination of the rotational shaft 162*b* is restricted by the engagement member 163. As a result, the rotational shafts 162*b* are attached substantially uniformly in relation to attachment position for each pedal device 50, whereby the player can experience a uniform operation feeling of the pedal 52 when he or she depresses the pedals 52 in the pedal device 50.

In addition, the pedal device 50 includes the processor configured to derive the depressing amount of the pedal 52 in accordance with the rotating amount of the rotational shaft 162*b*. As a result, a damper effect of a damper or the like can be imparted in accordance with the depressing amount of the pedal 52 by which the pedal 52 is depressed.

The engagement member 163 has the boss 163*c* which can be inserted into the base plate 161. As a result, the engagement member 163 can be fixed to the base plate 161 with the simple and easy construction.

The engagement member 163 has the abutment surface 163*d* which is brought into abutment with the base plate 161. As a result, the rotational shaft 162*b* can be positioned based upon a secure engagement which can be provided between the engagement member 163 and the non-rotational portion 162*c*.

The engagement member 163 has the support hole portion 163*a* which penetrates the engagement member 163 in the axial direction of the rotational shaft 162*b*. The non-rotational portion 162*c* is inserted into this support hole portion 163*a*. As a result, since the outer circumference of the cylindrical non-rotational portion 162*c* can be supported by the engagement member 163 in an ensured fashion, the rotational shaft 162*b* can be positioned with greater accuracy.

The cover member 165 includes the first movement restricting portion 165*d* configured to restrict the movement of the engagement member 163 by being brought into abutment with the abutment portion which is the collar portion 163*b* of the engagement member 163 and is provided on the base plate 161 in such a manner as to cover the rotary volume 162. As a result, even in the event that the pedal device 50 receives an impact, a risk is reduced that the engagement member 163 is caused to move towards the distal end of the rotational shaft 162*b*, whereby the rotational shaft 162*b* is continuously positioned in a stabler fashion.

The cam member 164 is provided on the rotational shaft 162*b* which includes the cam portion 164*a* configured to be brought into engagement with the arm portion 144 of the pedal 52, and the cover member 165 has the second movement restricting portion 165*e* configured to restrict the movement of the cam member 164. As a result, even in the event that the pedal device 50 receives an impact, a risk is reduced that the cam member 164, which is configured to rotate the rotational shaft 162*b* in accordance with a depressing amount of the pedal 52, is caused to move towards the distal end of the rotational shaft 162*b*.

The pedal device 50 has the torsion coil spring 166 of which the one leg portion 166*a* is locked on the cam member 164 and the other leg portion 166*b* is locked on the cover member 165. As a result, since the cam portion 164*a* (the cam surface 164*a*1) of the cam member 164 can be brought into abutment with the cam surface 144*a* of the arm portion 144 in an ensured fashion, a depressing amount of the pedal 52 can be detected with good accuracy.

The electronic keyboard instrument 10 has the pedal device 50. As a result, the electronic keyboard instrument 10 can be provided in which with the pedal device 50, the uniform pedal operation feeling is provided when the pedals 52 are depressed. While the pedal device 50 is described as being provided in the electronic keyboard instrument 10 in the present embodiment, the pedal device 50 can also be provided in other instruments and electronic instruments.

While the embodiment of the present disclosure has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A pedal device comprising:

a base plate;

a pedal supported rotatably;

a rotary volume comprising a rotational shaft configured to rotate in association with the pedal; and an engagement member configured to be brought into engagement with a non-rotational portion provided around the rotational shaft of the rotary volume and with the base plate, wherein the engagement member comprises a support hole portion which penetrates the engagement member in an axial direction of the rotational shaft, and wherein the non-rotational portion is inserted into the support hole portion.

2. The pedal device according to claim 1, wherein the rotary volume is provided on the base plate.

3. The pedal device according to claim 1, comprising:

a processor configured to derive a depressing amount of the pedal in accordance with a rotating amount of the rotational shaft.

4. The pedal device according to claim 1, wherein the engagement member comprises a boss configured to be inserted into the base plate.

5. The pedal device according to claim 1, wherein the engagement member comprises an abutment surface configured to be brought into abutment with the base plate.

6. The pedal device according to claim 1, comprising:

a cover member comprising a first movement restricting portion configured to restrict a movement of the engagement member in an axial direction of the rotational shaft by being brought into abutment with an abutment portion of the engagement member and configured to cover the rotary volume.

7. The pedal device according to claim 1, comprising:

a cam member provided on the rotational shaft, the cam member comprising a cam portion configured to be brought into engagement with an arm portion of the pedal; and a frame portion comprising a second movement restricting portion configured to restrict a movement of the cam member in an axial direction of the rotational shaft.

8. The pedal device according to claim 7, comprising:

a torsion coil spring of which one leg portion is locked on the cam member, and a remaining leg portion is locked on the frame portion.

9. The pedal device according to claim 1, wherein the rotary volume comprises a rotary volume main body portion of a substantially rectangular parallelepiped box shape, and wherein plural terminals configured to be inserted into the base plate are provided on the rotary volume main body portion in such a manner as to project from a lower surface thereof.

10. The pedal device according to claim 6, wherein the cover member covers a rotary volume main body portion of the rotary volume, the non-rotational portion, and a part of a proximal portion side of the rotational shaft of the rotary volume.

11. An electronic keyboard instrument comprising:

a keyboard; and the pedal device according to claim 1.

12. A pedal device comprising:

a base plate;

a pedal supported rotatably;

a rotary volume comprising a rotational shaft configured to rotate in association with the pedal; and an engagement member configured to be brought into engagement with a non-rotational portion provided around the rotational shaft of the rotary volume and with the base plate, wherein a cam member is provided on the rotational shaft, the cam member comprising a substantially cylindrical attachment portion and a cam portion provided in such a manner as to project radially outwards from the substantially cylindrical attachment portion, and wherein the cam portion is configured to be brought into engagement with an arm portion of the pedal.

13. The pedal device according to claim 12, wherein a radially outwardly projecting projection is provided at a lower portion of the substantially cylindrical attachment portion.

14. A pedal device comprising:

a base plate;

a pedal supported rotatably;

a rotary volume comprising a rotational shaft configured to rotate in association with the pedal;

an engagement member configured to be brought into engagement with a non-rotational portion provided around the rotational shaft of the rotary volume and with the base plate; and a cover member configured to cover a part of the rotary volume and the engagement member, wherein the cover member comprises a cover main body portion which is opened in a lower side and a frame portion configured to extend from a lower end portion of the cover main body portion in an axial direction of the rotational shaft.

15. The pedal device according to claim 14, wherein the cover member comprises a rectangular parallelepiped box portion and an arc-shaped portion which are provided contiguously with each other.

16. The pedal device according to claim 14, wherein bolt holes are provided individually on outer sides of the cover main body portion and the frame portion in the axial direction of the rotational shaft for fastening to the base plate with a screw.

17. The pedal device according to claim 16, wherein a boss is provided on a portion of a lower surface which lies near an inner side of the each of the bolt holes.

18. The pedal device according to claim 14, wherein the cover member covers a rotary volume main body portion of the rotary volume, the non-rotational portion, and a part of a proximal portion side of the rotational shaft of the rotary volume.

19. The pedal device according to claim 15, wherein the rectangular parallelepiped box portion covers a rotary volume main body portion of the rotary volume, and wherein the arc-shaped portion covers the engagement member.

* * * * *